US008482831B2

United States Patent
Hisa

(10) Patent No.: US 8,482,831 B2
(45) Date of Patent: Jul. 9, 2013

(54) OPTICAL SCANNING DEVICE AND IMAGE FORMING APPARATUS

(75) Inventor: Fumiya Hisa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 395 days.

(21) Appl. No.: 12/403,043

(22) Filed: Mar. 12, 2009

(65) Prior Publication Data

US 2009/0231658 A1    Sep. 17, 2009

(30) Foreign Application Priority Data

Mar. 14, 2008    (JP) .................. 2008-066485

(51) Int. Cl.
*G02B 26/08* (2006.01)
*B41J 27/00* (2006.01)

(52) U.S. Cl.
USPC .................................. 359/216.1; 347/261

(58) Field of Classification Search
USPC ............. 359/216.1, 217.1, 218.1; 347/256, 347/260, 261
See application file for complete search history.

(56) References Cited

U.S. PATENT DOCUMENTS

| | | | |
|---|---|---|---|
| 6,390,369 B1 | 5/2002 | Tang et al. | |
| 2006/0114540 A1* | 6/2006 | Mikami | 359/216 |
| 2007/0058235 A1* | 3/2007 | Nagase | 359/216 |
| 2007/0253052 A1* | 11/2007 | Kato et al. | 359/216 |
| 2008/0225368 A1* | 9/2008 | Ciabattoni et al. | 359/216 |
| 2008/0259430 A1* | 10/2008 | Fukushima et al. | 359/216 |

FOREIGN PATENT DOCUMENTS

| | | |
|---|---|---|
| JP | 58-162116 | 9/1983 |
| JP | 59-112213 | 6/1984 |
| JP | 5-26229 A | 2/1993 |
| JP | 05-341221 | 12/1993 |
| JP | 6-175063 | 6/1994 |
| JP | 6-289813 | 10/1994 |
| JP | 7-064007 | 3/1995 |
| JP | 7-064010 | 3/1995 |
| JP | 9-127452 | 5/1997 |
| JP | 10-148784 | 6/1998 |
| JP | 10-319340 | 12/1998 |
| JP | 11-119138 A | 4/1999 |
| JP | 2596244 Y | 6/1999 |
| JP | 11-237574 A | 8/1999 |
| JP | 2000-147412 A | 5/2000 |
| JP | 2005-122024 | 5/2005 |
| JP | 3887995 B | 12/2006 |
| JP | 2007-93638 | 4/2007 |

* cited by examiner

*Primary Examiner* — Frank Font
(74) *Attorney, Agent, or Firm* — Sughrue Mion, PLLC

(57) ABSTRACT

The present invention provides an optical scanning device that can suppress irregularity of the rotation of a polygon mirror and an image forming apparatus that is disposed with this optical scanning device. The optical scanning device includes: a rotating polygon mirror that rotates and deflects light that has been emitted from a light source; and a plate member that covers one surface of surfaces intersecting an axial direction of a rotating shaft of the rotating polygon mirror, wherein a projecting portion that projects in the axial direction of the rotating shaft away from the rotating polygon mirror is disposed in the plate member.

11 Claims, 15 Drawing Sheets

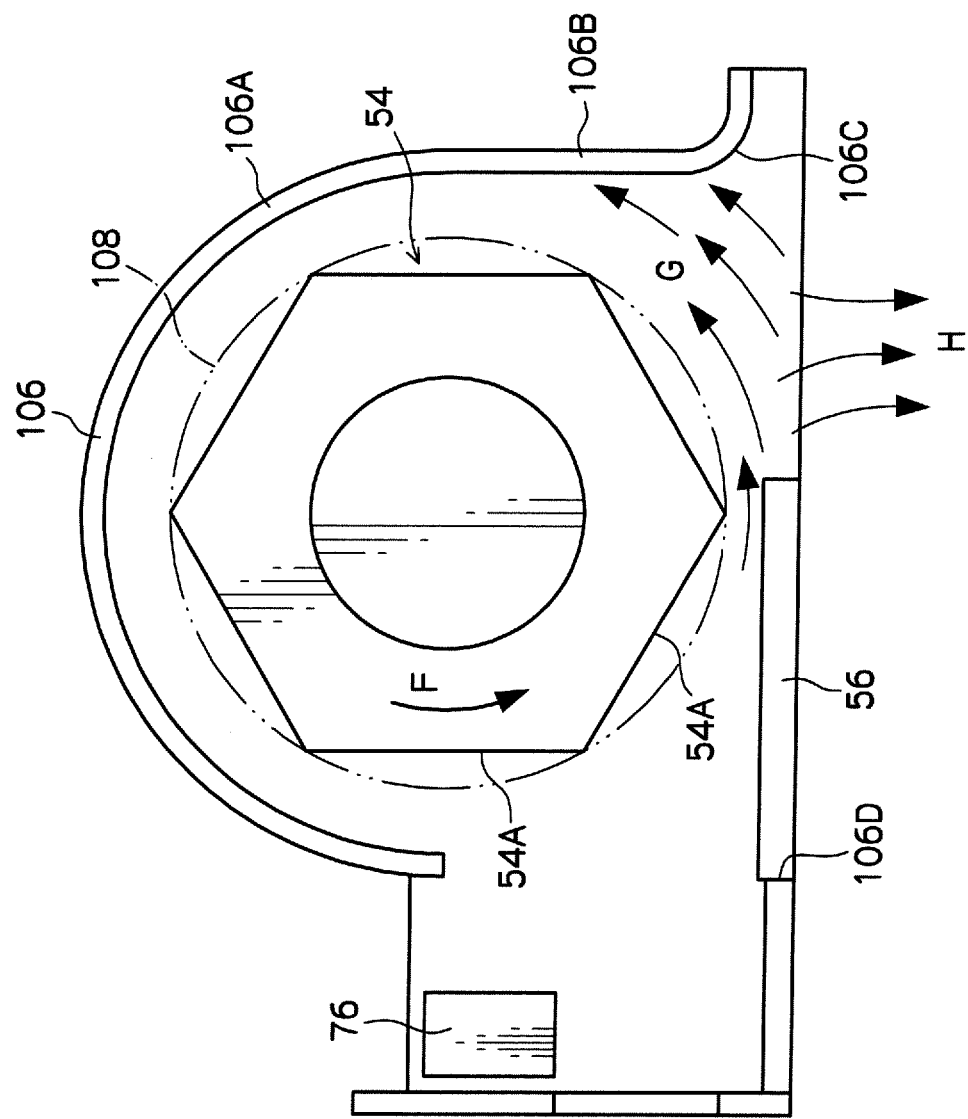

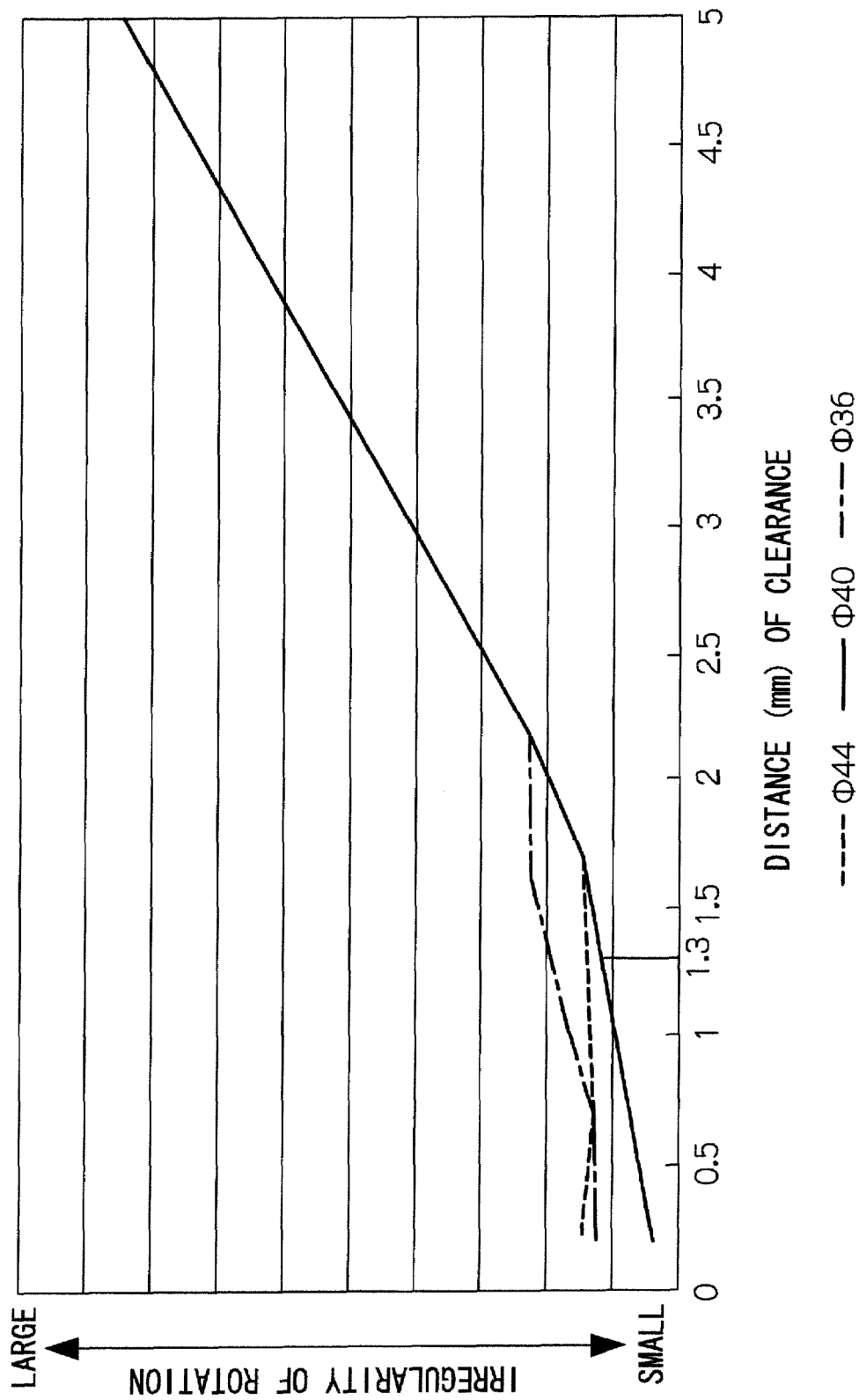

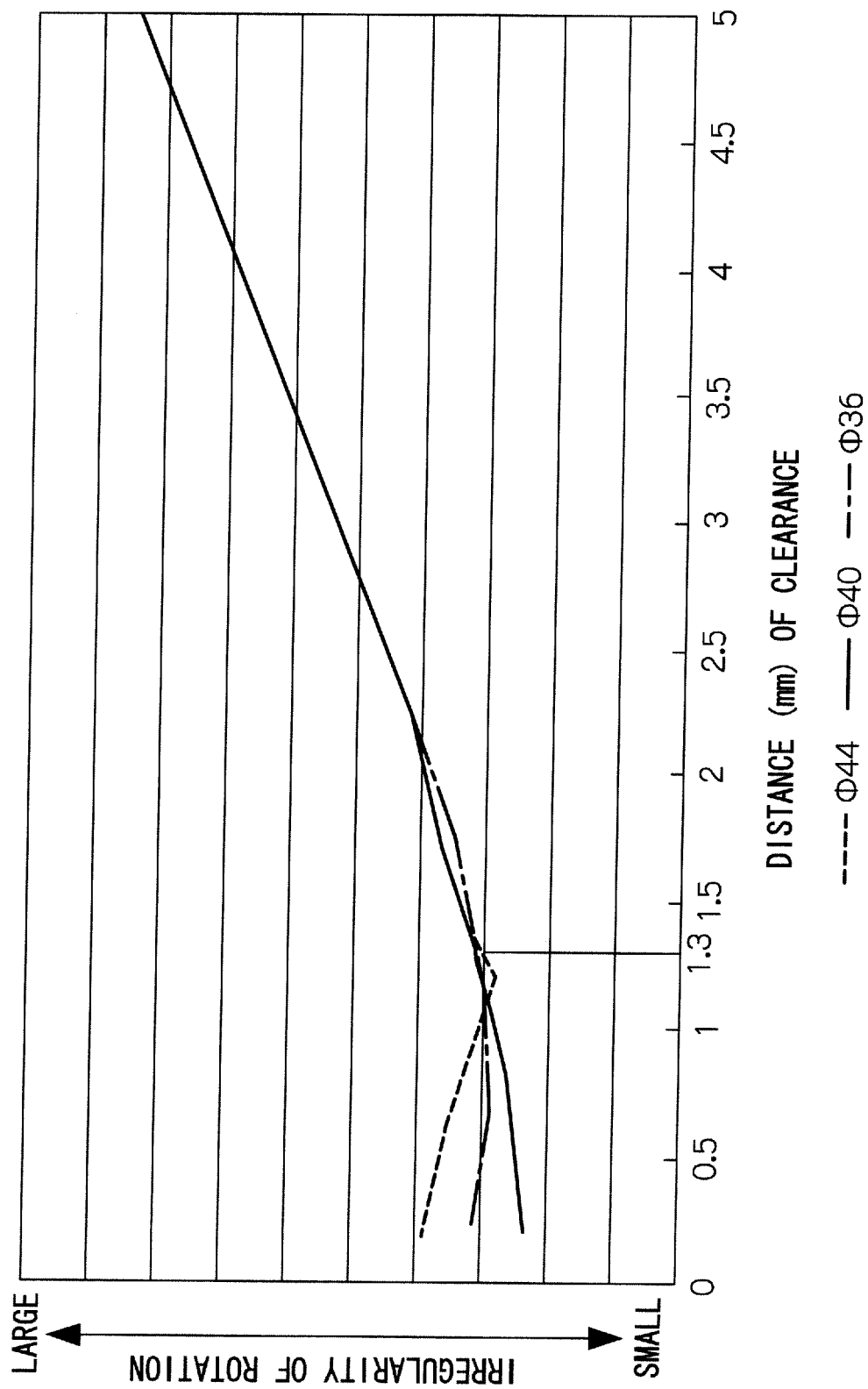

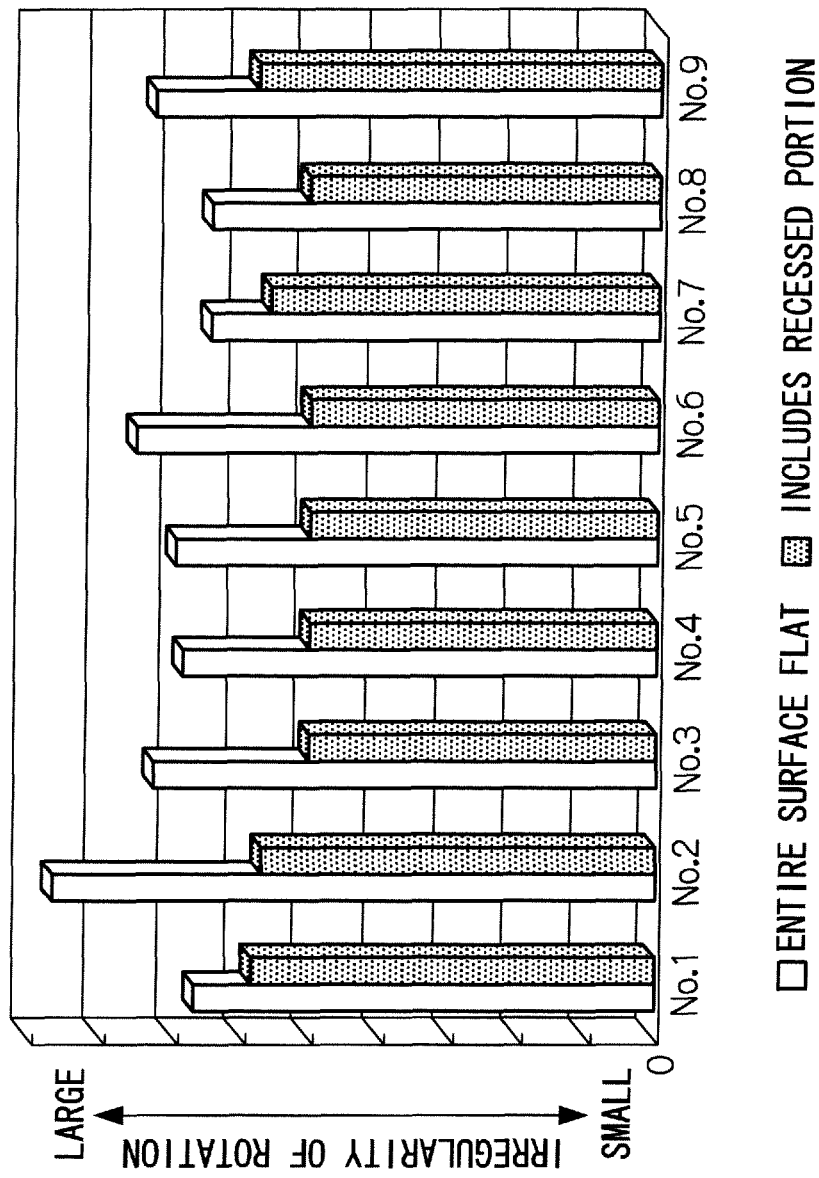

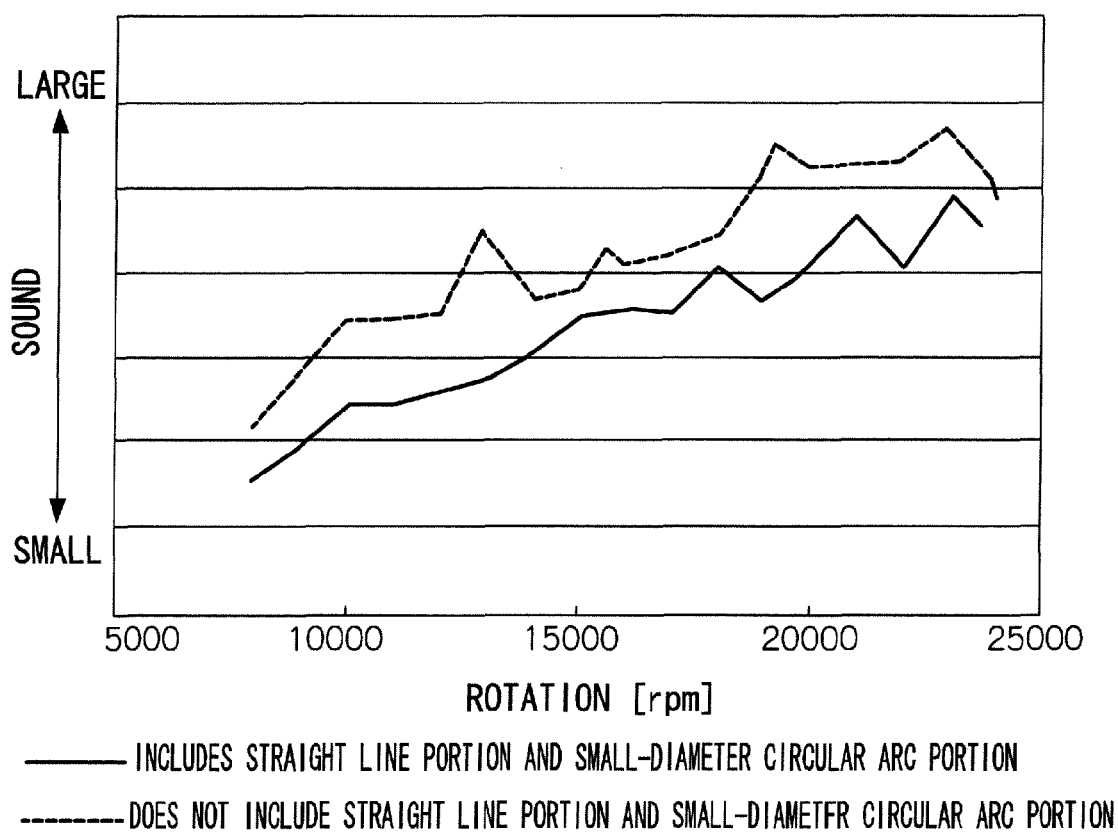

US 8,482,831 B2

OPTICAL SCANNING DEVICE AND IMAGE FORMING APPARATUS

CROSS-REFERENCE TO RELATED APPLICATION

This application is based on and claims priority under 35 USC 119 from Japanese Patent Application No. 2008-066485 filed Mar. 14, 2008.

BACKGROUND

1. Technical Field

The present invention relates to an optical scanning device such as a laser printer or a digital copier and to an image forming apparatus that is disposed with this optical scanning device.

2. Related Art

An optical scanning device has been known that is disposed with a rotating polygon mirror that performs optical scanning by deflecting laser light emitted from a light source and an optical cover that covers this rotating polygon mirror. Specifically, in such a device, by disposing the optical cover that covers the entire rotating polygon mirror, dust and dirt are prevented from adhering to deflection surfaces of the rotating polygon mirror.

However, a plate member of the optical cover that covers an upper surface of the rotating polygon mirror is formed flatly.

Here, ordinarily, a first airflow that flows outward in a radial direction from a rotating shaft of the rotating polygon mirror is generated between the upper surface of the rotating polygon mirror and a ceiling plate when the rotating polygon mirror is rotated. Further, a second airflow that flows toward the ceiling plate along the deflection surfaces of the rotating polygon mirror is generated on the deflection surfaces of the rotating polygon mirror.

Thus, when the first airflow and the second airflow collide with each other in a case where the plate member that covers the upper surface of the rotating polygon mirror is formed flatly, there is nowhere for the air to escape upward, and the colliding air presses the rotating polygon mirror. In this manner, when the colliding air presses the rotating polygon mirror, irregularities occur in the rotation of the rotating polygon mirror.

SUMMARY

According to an aspect of the invention, an optical scanning device includes a rotating polygon mirror that rotates and deflects light that has been emitted from a light source and a plate member that covers one surface of surfaces intersecting an axial direction of a rotating shaft of the rotating polygon mirror, wherein a projecting portion that is projects in the axial direction of the rotating shaft away from the rotating polygon mirror is disposed in the plate member.

BRIEF DESCRIPTION OF THE DRAWINGS

An exemplary embodiment of the present invention will be described in detail based on the following figures, wherein:

FIG. 3 is a plan diagram showing the optical deflector of the optical scanning device pertaining to the exemplary embodiment of the invention;

FIG. 4 is a line graph showing an evaluation of irregularity of the rotation of the rotating polygon mirror in the optical scanning device pertaining to the exemplary embodiment of the invention;

FIG. 5 is a line graph showing an evaluation of irregularity of the rotation of the rotating polygon mirror in the optical scanning device pertaining to the exemplary embodiment of the invention;

FIG. 6 is a bar graph showing an evaluation of irregularity of the rotation of the rotating polygon mirror in the optical scanning device pertaining to the exemplary embodiment of the invention;

FIG. 7A and FIG. 7B are line graphs showing evaluations of noise produced by irregularity of the rotation of the rotating polygon mirror in the optical scanning device pertaining to the exemplary embodiment of the invention;

DETAILED DESCRIPTION

An example of an image forming apparatus 10 that employs an optical scanning device pertaining to an exemplary embodiment of the present invention will be described in accordance with FIG. 1 to FIG. 14.

(Overall Configuration)

Figure 14:
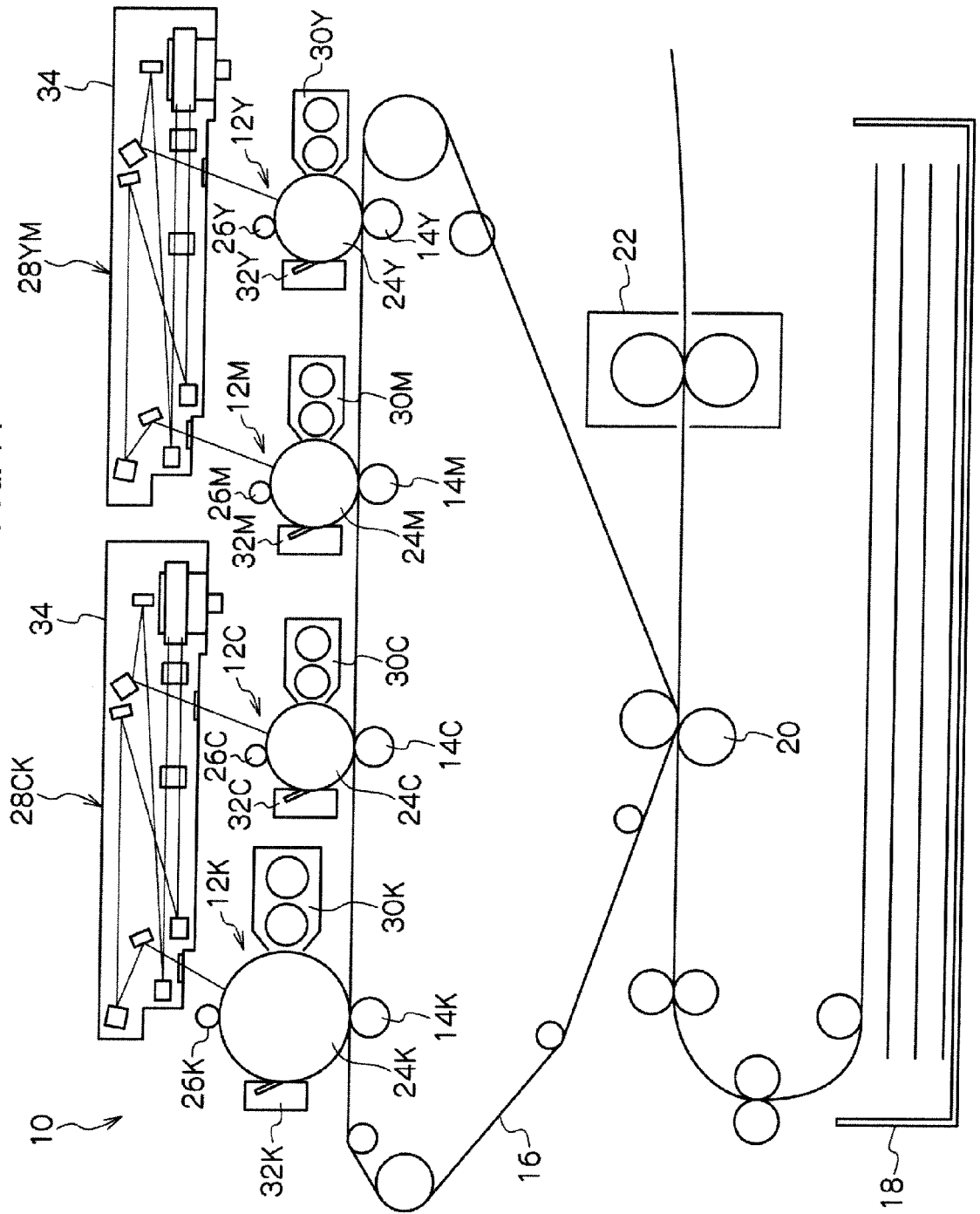
FIG. 14 is a general configural diagram showing an image forming apparatus in which the optical scanning devices pertaining to the exemplary embodiment of the invention are employed.

As shown in FIG. 14, the image forming apparatus 10 is disposed with an optical scanning device 28CK and an optical scanning device 28YM. The optical scanning device 28CK scans and exposes to light a photoconductor 24C and a photoconductor 24K and is disposed with an optical system corresponding to the colors of cyan (C) and black (K). The optical scanning device 28YM scans and exposes to light a photoconductor 24Y and a photoconductor 24M and is disposed with an optical system corresponding to the colors of yellow (Y) and magenta (M).

Further, the image forming apparatus 10 is disposed with electrophotographic units 12Y, 12M, 12C and 12K that form toner images in the four colors of yellow (Y), magenta (M), cyan (C) and black (K). The electrophotographic unit 12Y is configured as a result of a charging device 26Y, the optical scanning device 28YM, a developing device 30Y, a transfer device 14Y and a cleaning device 32Y being disposed around the photoconductor 24Y. The electrophotographic units 12M, 12C and 12K also have the same configuration.

Moreover, the image forming apparatus 10 is disposed with an intermediate transfer belt 16, onto which the toner images are laminated by the transfer devices 14Y to 14K to form a color toner image, a transfer device 20, which transfers the color toner image that has been transferred onto the intermediate transfer belt 16 to a sheet material P that has been supplied from a tray 18, and a fixing device 22, which melts and fixes the color toner image that has been transferred onto the sheet material P.

Figure 10:
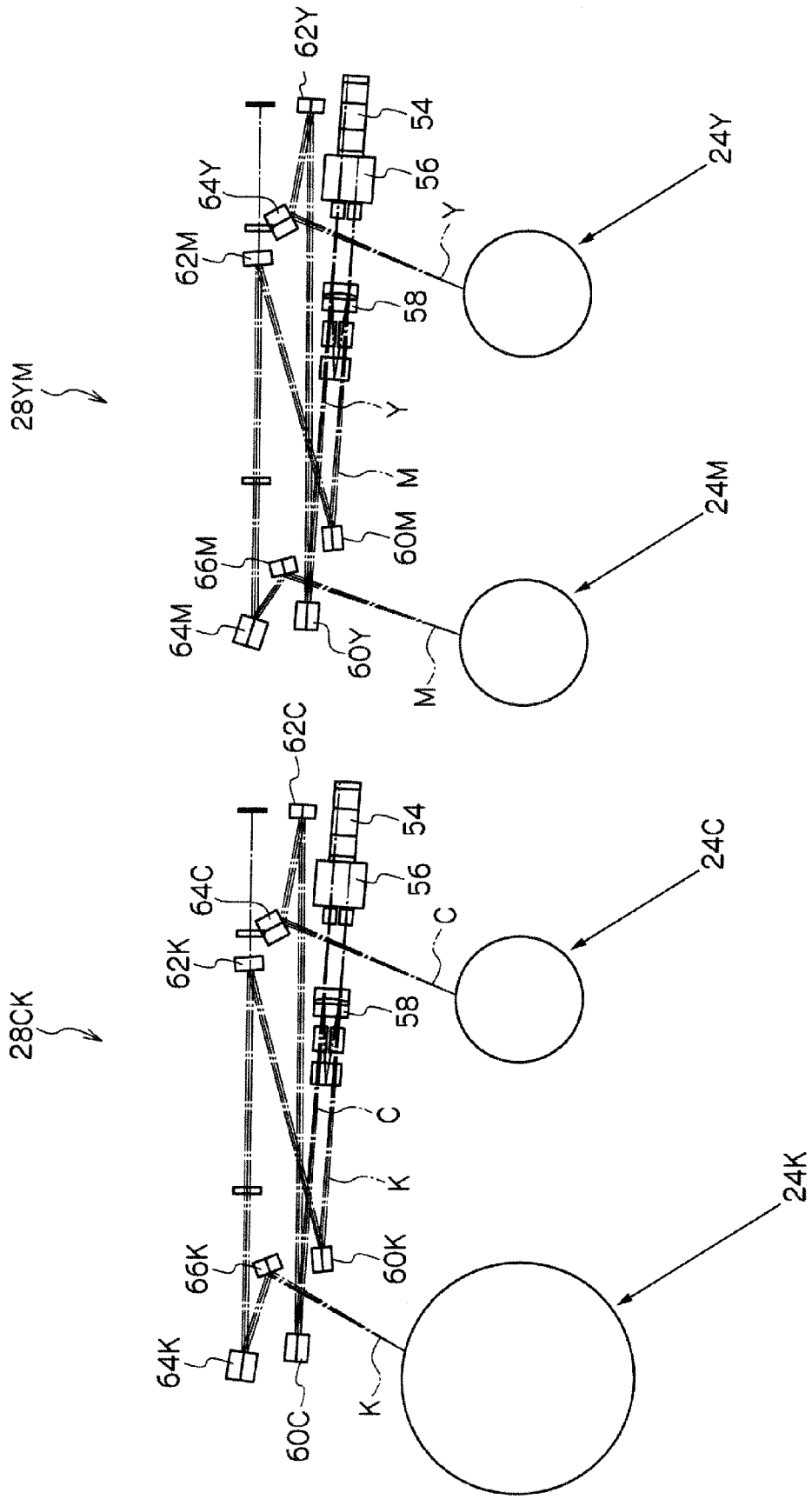
FIG. 10 is a side diagram showing photoconductors and the optical scanning devices pertaining to the exemplary embodiment of the invention.
Figure 13:
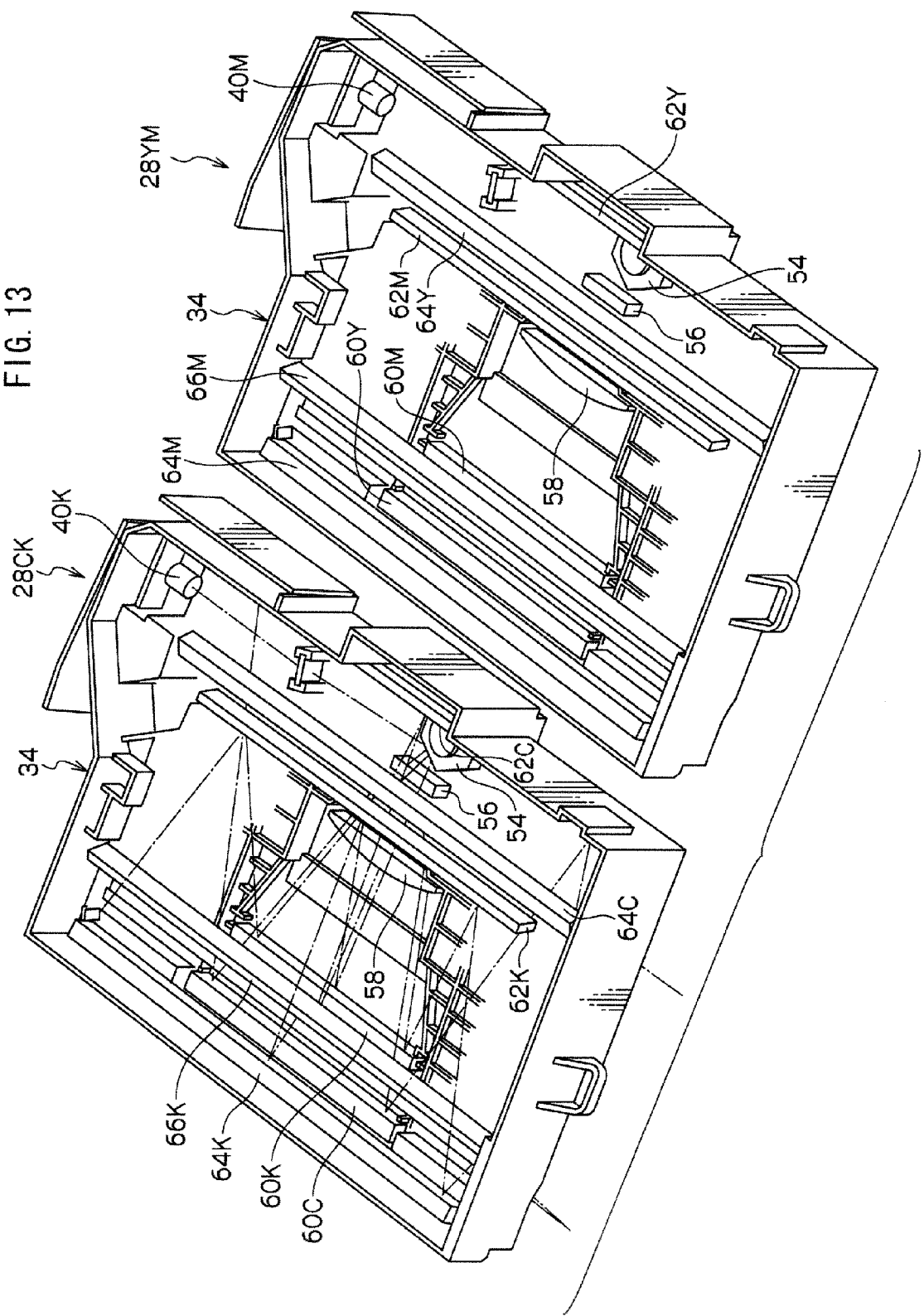
FIG. 13 is a perspective diagram showing the optical scanning devices pertaining to the exemplary embodiment of the invention.

As shown in FIG. 10 and FIG. 13, each of the optical scanning devices 28YM and 28CK is disposed with a rectangular box-like housing 34. It will be noted that, because the insides of the optical scanning devices 28YM and 28CK have substantially the same structure, here, just the optical scanning device 28CK will be described.

Figure 11:
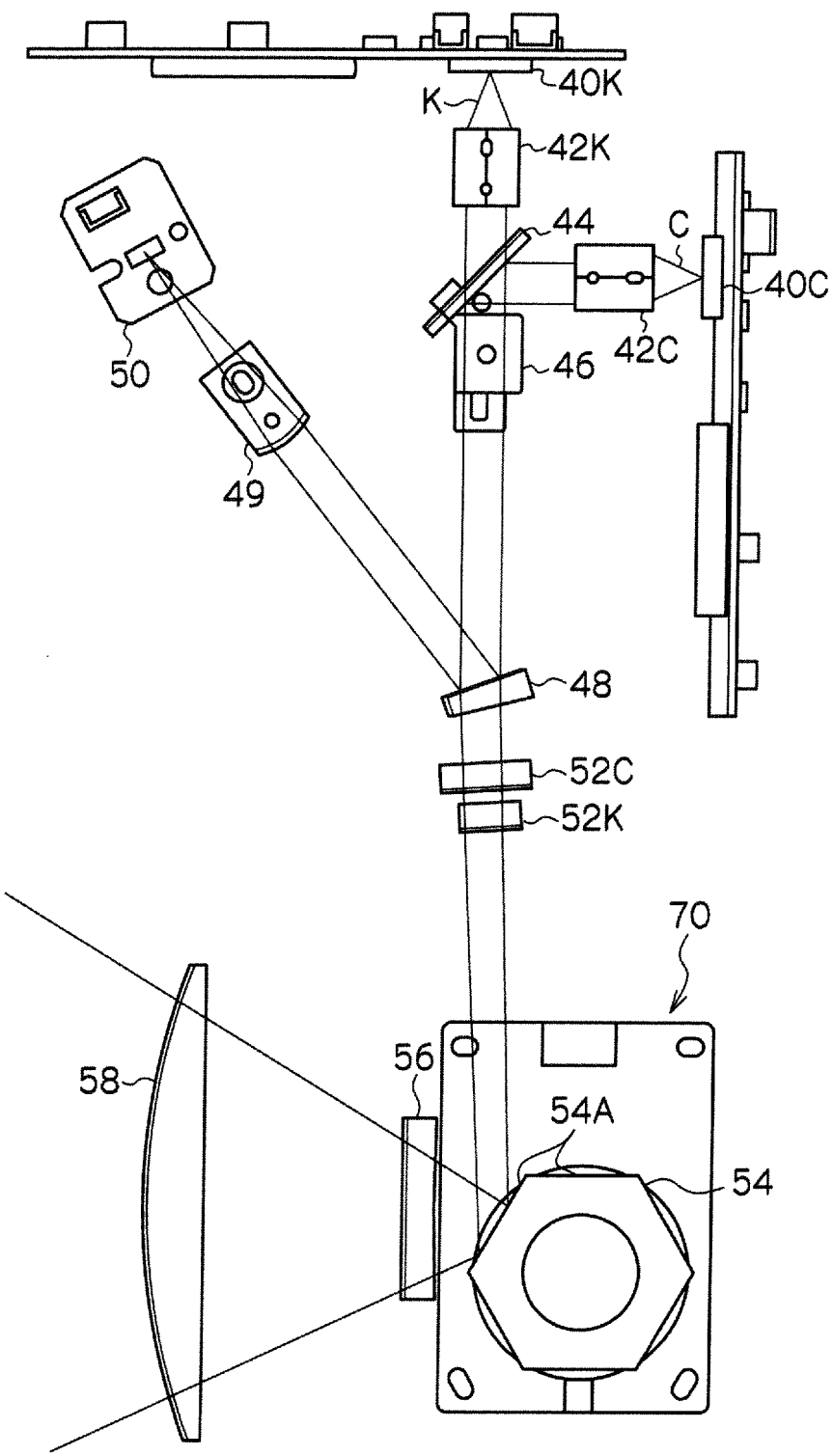
FIG. 11 is a plan diagram showing the optical scanning device pertaining to the exemplary embodiment of the invention.
Figure 12:
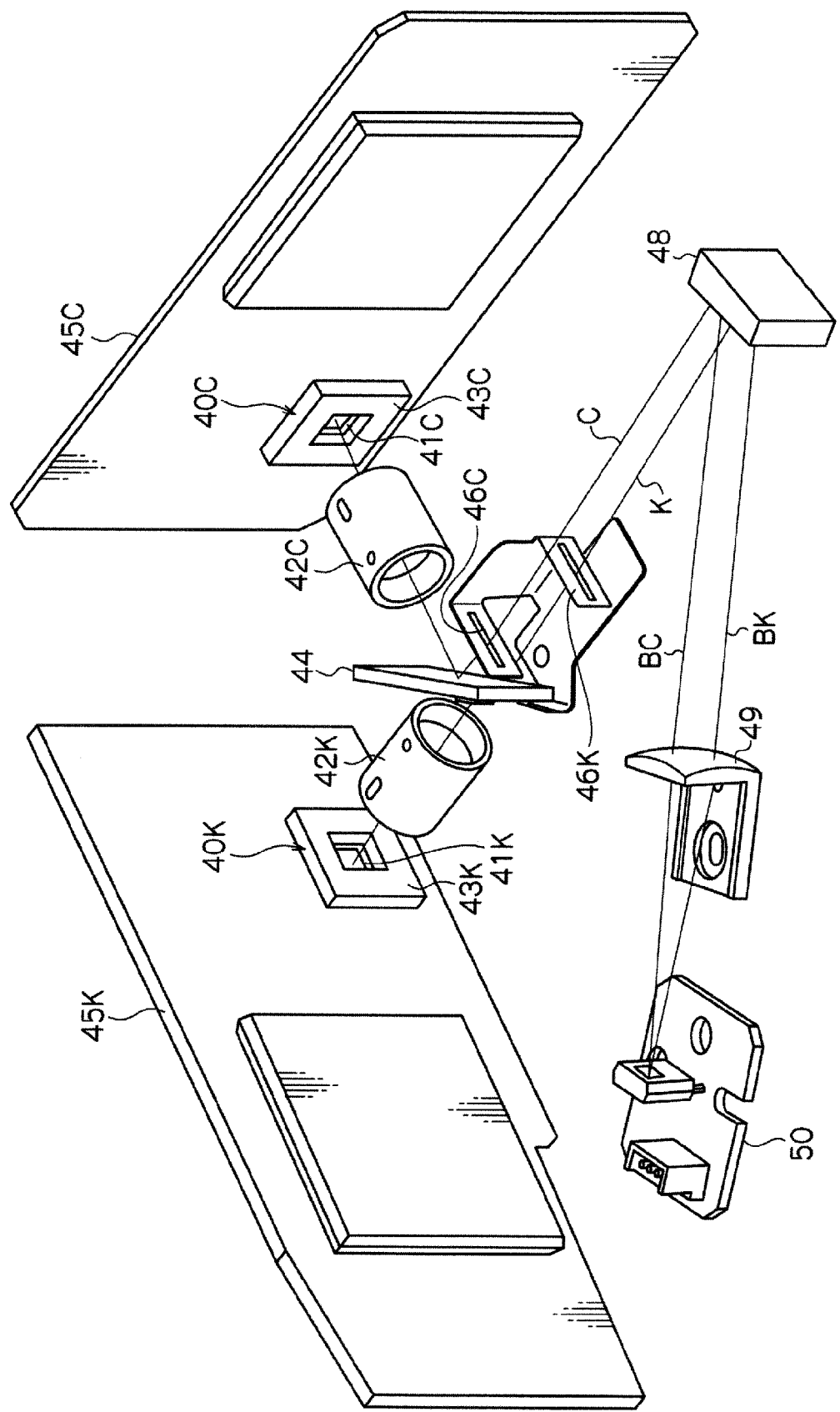
FIG. 12 is a conceptual diagram showing the optical scanning device pertaining to the exemplary embodiment of the invention.

As shown in FIG. 11 and FIG. 12, in the housing 34, a light source component 40K that emits a light beam K corresponding to the K color and a light source component 40C that emits a light beam C corresponding to the C color are disposed such that their emission directions form an angle of 90 degrees with each other. In the present exemplary embodiment, surface-emitting semiconductor lasers are used as the light sources.

As shown in FIG. 12, the light source components 40C and 40K are configured by surface-emitting laser chips 41C and 41K and holding members 43C and 43K. The surface-emitting laser chips 41C and 41K are configured to be capable of emitting plural beams of laser light simultaneously. The holding members 43C and 43K are members for holding the surface-emitting laser chips 41C and 41K. The holding members 43C and 43K are commonly called leadless chip carriers (LLC), and, here, ceramic is used as their material. The surface-emitting laser chips 41C and 41K are respectively electrically connected to circuit boards 45C and 45K on which electrical circuits are mounted via the holding members 43C and 43K.

Further, the light source component 40C that emits the light beam C is installed such that its height direction is shifted with respect to the light source component 40K that emits the light beam K. The light beam C and the light beam K are disposed so as to be a predetermined distance apart in their height direction.

Moreover, a collimator lens unit 42K for collimating the light beam K is disposed on the optical path of the light beam K emitted from the light source component 40K. The light beam K that has passed through the collimator lens unit 42K passes under a reflecting mirror 44, is made incident on a slit plate 46K, and is made incident on a half mirror 48 disposed on the optical path.

As shown in FIG. 11, the half mirror 48 sorts the light beam K by a predetermined ratio into a light beam K that passes through the half mirror 48 and a light beam BK that is reflected by the half mirror 48, is collected by a collecting lens 49 and is made incident on an optical power monitor 50. In the present exemplary embodiment, surface-emitting lasers are used. For this reason, light for light amount control cannot be obtained from a back beam, so some of the light beam that has been forwardly emitted in this manner is utilized. The light beam K that has passed through the half mirror 48 passes through a cylindrical lens 52K and is made incident on a polygon mirror 54 that serves as one example of a rotating polygon mirror disposed on the optical path. Additionally, this polygon mirror 54 is configured in a regular hexagonal shape when seen from an axial direction of a rotating shaft 86 (see FIG. 1).

A collimator lens unit 42C for collimating the light beam C is disposed on the optical path of the light beam C emitted from the light source component 40C. The light beam C that has passed through the collimator lens unit 42C is deflected by the half mirror 44, is made incident on a slit plate 46C (see FIG. 12), and is made incident on the half mirror 48 disposed on the optical path. The half mirror 48 sorts the light beam C by a predetermined ratio into a light beam C that passes through the half mirror 48 and a light beam BC that is reflected by the half mirror 48, is collected by the collecting lens 49 and is made incident on the optical power monitor 50. The light beam C that has passed through the half mirror 48 passes through a cylindrical lens 52C and is made incident on the polygon mirror 54 of an optical deflector 70 disposed on the optical path.

Plural reflecting mirror surfaces 54A are disposed on the polygon mirror 54. The light beams C and K that have been made incident on the polygon mirror 54 are, as shown also in FIG. 10, deflected and reflected by the reflecting mirror surfaces 54A and made incident on fθ lenses 56 and 58. The polygon mirror 54 and the fθ lenses 56 and 58 are of sizes that can simultaneously scan the light beams C and K.

Further, as shown in FIG. 10, the two-color light beams C and K that have passed through the fθ lens 56 are divided and reflected on cylindrical mirrors 60C and 60K that have power on their sub-scanning sides. The light beam K that has been reflected by the cylindrical mirror 60K is directed back to a reflecting mirror 62K, is deflected by a cylindrical mirror 64K and a reflecting mirror 66K, and is imaged on the photoconductor 24K to form an electrostatic latent image.

The light beam C that has been reflected by the cylindrical mirror 60C is directed back to a reflecting mirror 62C, is deflected by a cylindrical mirror 64C, and is imaged on the photoconductor 24C to form an electrostatic latent image.

(Central Portion)

Next, the optical deflector 70 in which the polygon mirror 54 is disposed will be described.

Figure 1:
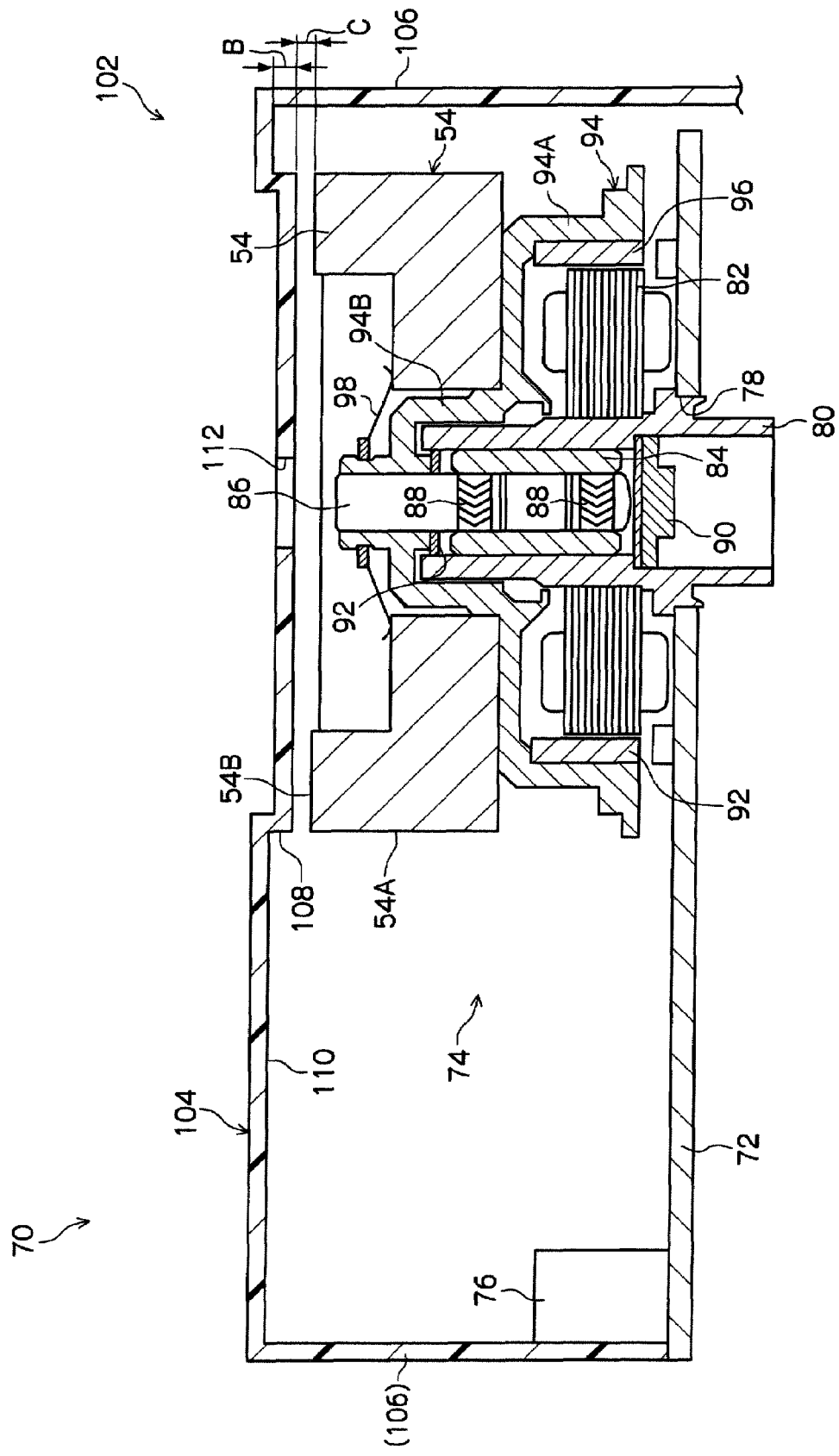
FIG. 1 is a cross-sectional diagram showing an optical deflector of an optical scanning device pertaining to the exemplary embodiment of the invention.
Figure 8:
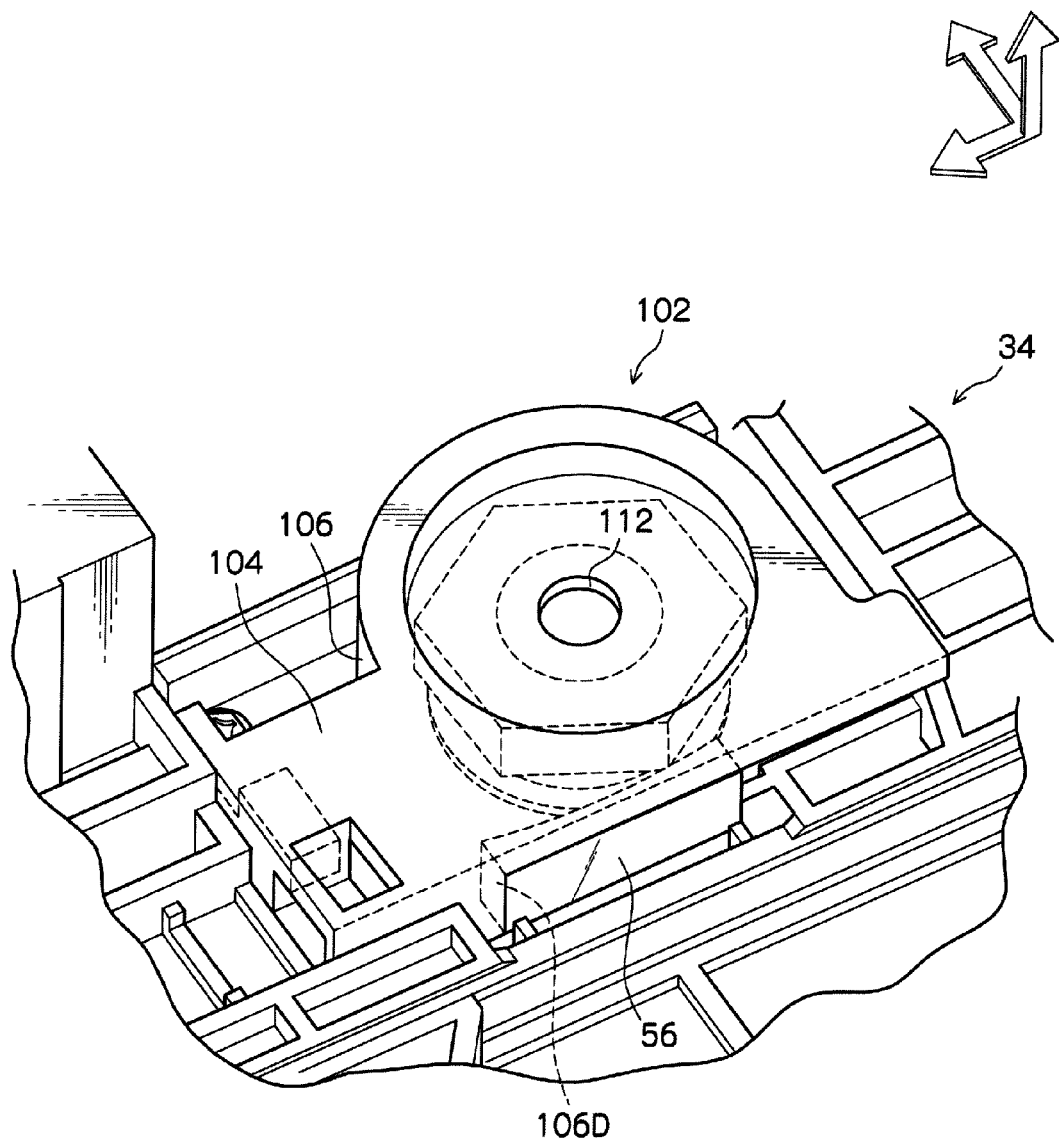
FIG. 8 is a perspective diagram showing the optical deflector of the optical scanning device pertaining to the exemplary embodiment of the invention.

As shown in FIG. 1 and FIG. 8, printed wiring board 72 that has a rectangular shape in planar view and becomes a base of the optical deflector 70 is disposed in the optical deflector 70.

As shown in FIG. 1, the polygon mirror 54 and a motor 74 are disposed further to one side of the center portion of the printed wiring board 72. Electrical components (not shown) that configure a drive control circuit for controlling the rotational driving of the polygon mirror 54 and the motor 74 are mounted on this printed wiring board 72. A connector 76, to which a power source and a signal cable are connected, is mounted on the end portion on the other side of the printed wiring board 72.

Further, a circular opening 78 is formed toward one side in the printed wiring board 72, and a fixed shaft 80 of a stator that configures the motor 74 is press-fitted into the opening 78.

The fixed shaft 80 is configured in a cylindrical shape, and plural drive coils 82 are attached substantially equidistantly along the circumferential direction to the outer peripheral surface of the fixed shaft 80. A sleeve 84 is inserted into the inside of this fixed shaft 80. A rotating shaft 86 of a rotor that configures the motor 74 is inserted through the sleeve 84 such that there is a predetermined clearance (several μm) therebetween.

Moreover, herringbone grooves 88 of a depth of several μm for configuring a plural dynamic bearing are formed along the circumferential direction in the upper and lower end portions of the outer peripheral surface of the insertion portion of the rotating shaft 86. Further, the inside of this fixed shaft 80 is filled with oil (lubricant) and sealed by seal members 90 and 92 such that the oil does not leak out.

A holding member 94 formed in a disc shape is press-fitted and fixed to the upper end portion of the rotating shaft 86. A large-diameter cylindrical portion 94A that covers the aforementioned drive coils 82 is disposed on the lower portion side of the holding member 94. A ring-shaped drive magnet 96 facing the outer peripheral side surfaces of the drive coils 82 is attached to the inner peripheral surface of the holding member 94. Further, the polygon mirror 54 is fitted into a small-diameter cylindrical portion 94B disposed on the upper portion of the holding member 94. The polygon mirror 54 is attached by a fixing-use spring 98. This polygon mirror 54 is made of aluminum, is formed in a polygonal column shape, and is disposed with the reflecting mirror surfaces 54A that serve as deflection surfaces that reflect the light.

Thus, in the optical deflector 70, the drive control circuit disposed on the printed wiring board 72 controls so as to apply a voltage to the drive coils 82, whereby current flows in the drive coils, electromagnetic induction action works by the current and the magnetic field of the drive magnetic 96 facing the drive coils 82, and rotational driving force is generated with respect to the drive magnetic 96. Because of this rotational driving force, the polygon mirror 54 rotates at a high speed. Further, in accompaniment with this rotation, dynamic pressure is generated between the sleeve 84 inside the fixed shaft 80 and the rotating shaft 86, and a dynamic bearing that supports a radial direction of the rotating shaft 86 is formed by this dynamic pressure.

Figure 9:
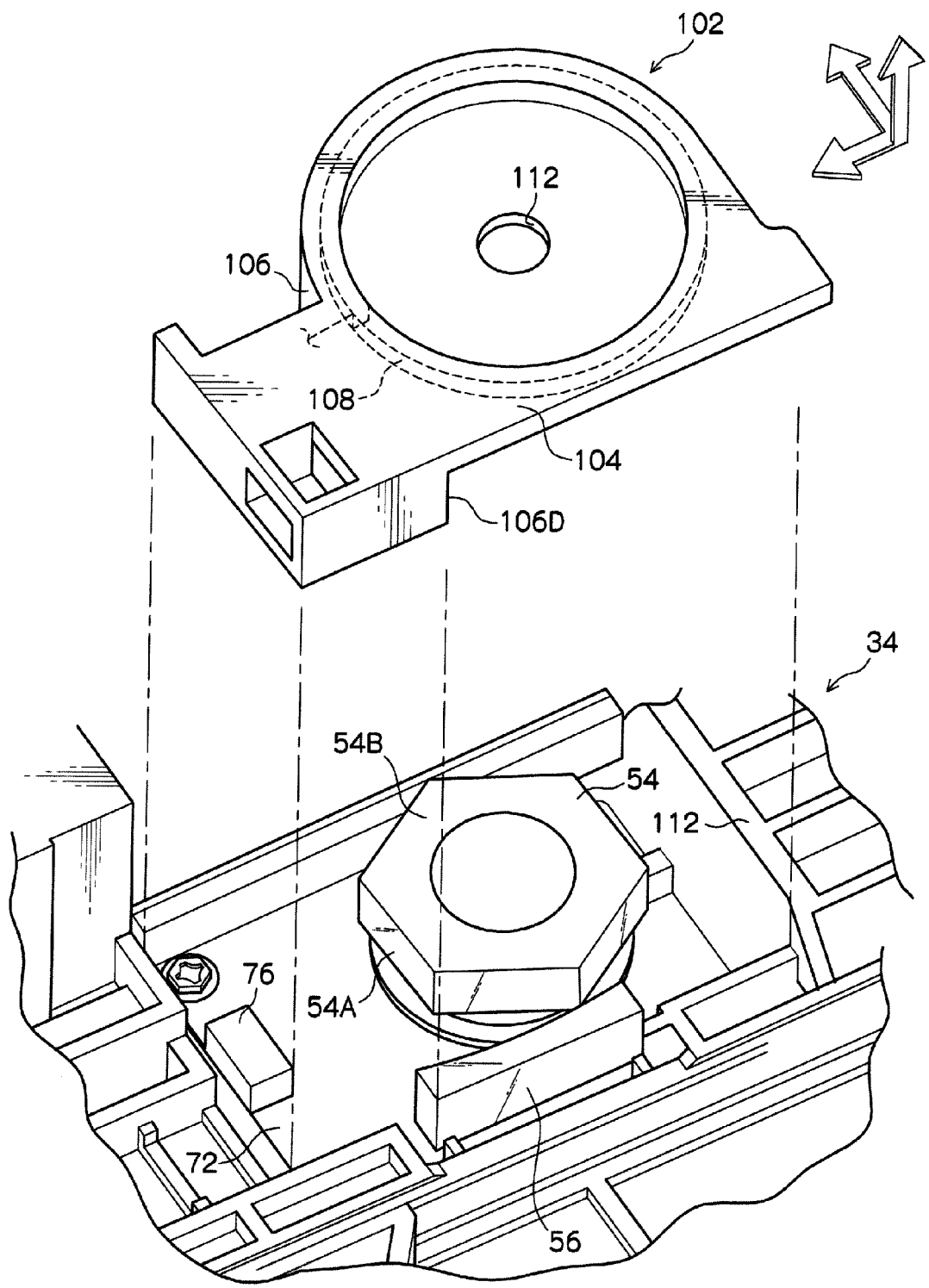
FIG. 9 is an exploded perspective diagram showing the optical deflector of the optical scanning device pertaining to the exemplary embodiment of the invention.

As shown in FIG. 9, a cover member 102 that covers the polygon mirror 54 is disposed in this optical deflector 70. As shown in FIG. 1, disposed in this cover member 102 are a plate-shaped ceiling plate member 104 that covers a surface 54B of the polygon mirror 54 on the opposite side of the motor 74 and a side wall member 106 that supports the ceiling plate member 104 and surrounds the reflecting mirror surfaces 54A. In other words, the ceiling plate member 104 is a plate member that covers one surface of surfaces intersecting the axial direction of the rotating shaft of the polygon mirror 54.

A projecting portion 110 that projects in a direction away from the polygon mirror 54 via a step portion 108 is disposed in the ceiling plate member 104. As shown in FIG. 3 and FIG. 9, the step portion 108 is disposed so as to draw a circle centering on the rotating shaft 86 when seen from the axial direction of the rotating shaft 86 (see FIG. 1). In other words, the projecting portion 110 is disposed on an outer side of the step portion 108 that is disposed so as to draw a circle.

Moreover, the circle drawn by the step portion 108 is configured to substantially coincide, from the axial direction, with a circumscribed circle of the regular hexagonal polygon mirror 54. Further, as shown in FIG. 1, the step (dimension B shown in FIG. 1) of the step portion 108 is configured to be equal to or greater than 1 mm, and the distance (dimension C shown in FIG. 1) between a plate surface 105 and the polygon mirror 54 is configured to be equal to or less than 1.3 mm. Further, a circular hole 112 that penetrates the surface and undersurface of the ceiling plate member 104 is disposed in the ceiling plate member 104 facing the surface 54B of the polygon mirror 54.

It will be noted that the circle drawn by the step portion 108 is described as substantially coinciding, from the axial direction, with a circumscribed circle of the regular hexagonal polygon mirror 54. The "substantially coinciding" in this case means coinciding allowing for a deviation of up to 2 mm in consideration of component attachment variations and component precision variations.

As shown in FIG. 3, a circular arc-shaped circular arc portion 106A that covers the reflecting mirror surfaces 54A is disposed in the side surface member 106 a certain distance away from the polygon mirror 54 when seen from the axial direction. Additionally, a straight line portion 106B that extends in a tangential direction is connected to one portion of this circular arc portion 106A. This straight line portion 106B extends in a direction away from the polygon mirror 54 via a small circular arc portion 106C and leads to the end portion.

Moreover, the side wall member 106 is disposed with a cutout portion 106D in which the fθ lens 56 that transmits the light that the polygon mirror 54 has reflected is disposed. Additionally, as shown in FIG. 3, one side of the fθ lens 56 is open when the fθ lens 56 is disposed in the cutout portion 106D.

(Operation)

Next, the operation of the present exemplary embodiment will be described.

As shown in FIG. 11, the light beams emitted from the light source components 40 are made incident on the polygon mirror 54. The optical beams are deflected and scanned by rotating the polygon mirror at a high speed.

Figure 2:
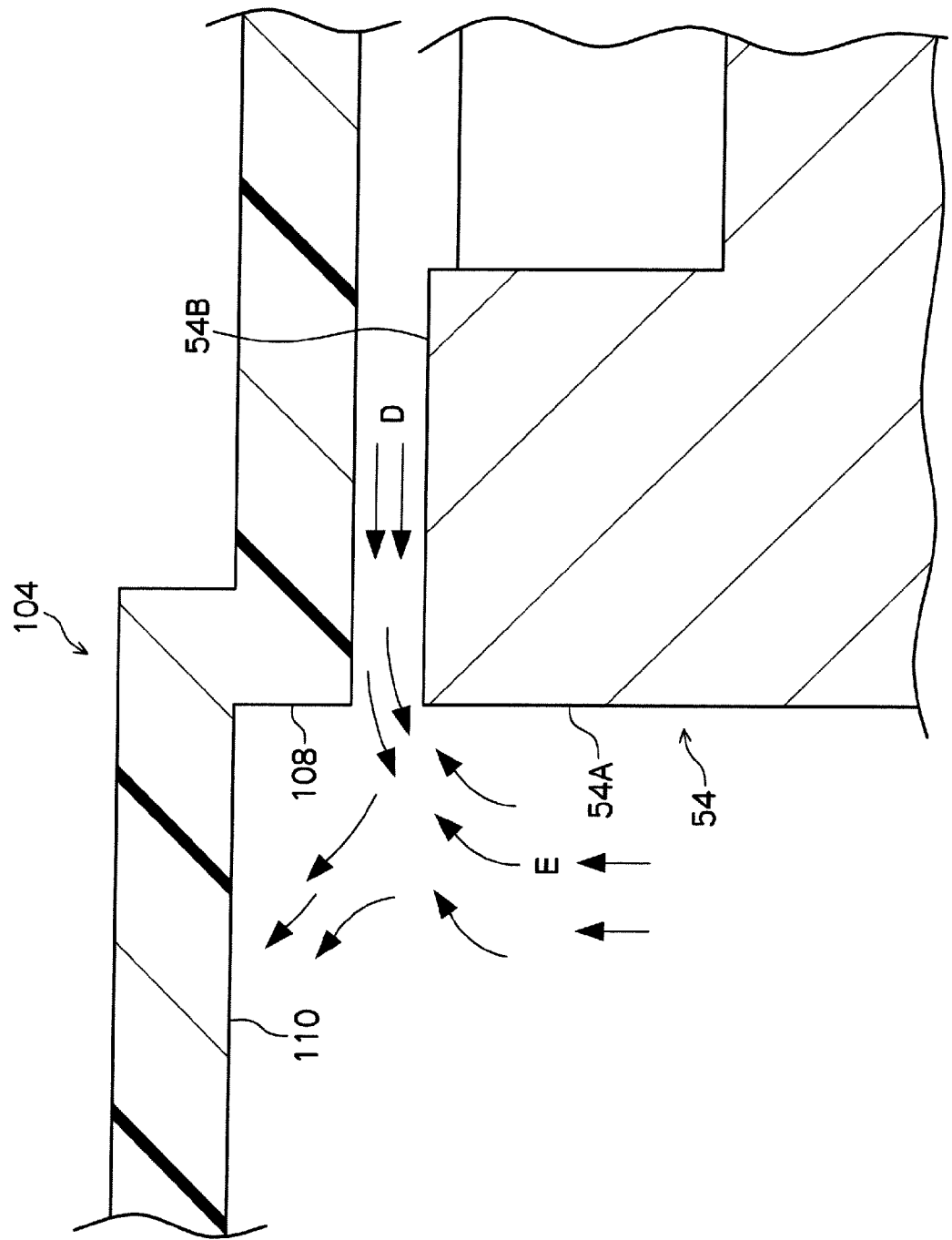
FIG. 2 is an enlarged cross-sectional diagram showing the optical deflector of the optical scanning device pertaining to the exemplary embodiment of the invention.

As shown in FIG. 2, when the polygon mirror 54 is rotated at a high speed, a first airflow (arrows D shown in FIG. 2) that flows outward in the radial direction from the rotating shaft 86 (see FIG. 1) is generated between the ceiling plate member 104 and the polygon mirror 54. Moreover, a second airflow (arrows E shown in FIG. 2) that flows toward the ceiling plate member 104 along the reflecting mirror surfaces 54A is generated on the deflection surfaces of the polygon mirror 54. Thus, when the second airflow collides with the first airflow, the colliding air flows toward the projecting portion 110 without pressing the polygon mirror 54.

In this manner, by disposing the projecting portion 110 in which the colliding air flows, the colliding air can be prevented from pressing the polygon mirror 54, and irregularity of the rotation of the polygon mirror 54 can be suppressed.

Further, as shown in FIG. 3, when the polygon mirror 54 rotates in the direction of arrow F, an airflow indicated by arrows G is generated around the polygon mirror 54. Then, the generated airflow strikes the plate surface of the straight line portion 106B or the curved surface of the small circular arc portion 106C without striking an edge of a member.

In this manner, the airflow indicated by arrows G strikes the plate surface of the straight line portion 106B or the curved surface of the small circular arc portion 106C. Thus, sound generated when the flowing air collides with an obstacle can be alleviated in comparison to when the flowing air strikes an edge or an end surface of the plate member.

Moreover, when the polygon mirror 54 rotates in the direction of arrow F, the airflow indicated by arrows G is generated, and some of this airflow flows outward (in the direction of arrows H) from the one side of the fθ lens 56 that is open. Meanwhile, in order to ensure an optical path, an obstacle or the like such as a projecting portion or the like is not disposed around the fθ lens 56 that transmits the light.

In other words, the flow of air outward (in the direction of arrows H) from around the fθ lens 56 does not collide with an obstacle or the like. For this reason, unpleasant wind sound generated as a result of the flow of air colliding with an obstacle can be reduced.

Further, as shown in FIG. 8, the circular hole 112 that penetrates the surface and undersurface of the ceiling plate member 104 is disposed in the ceiling plate member 104. As mentioned earlier, when the polygon mirror 54 rotates, the first airflow that flows outward so as to spread in all directions is generated between the polygon mirror 54 and the ceiling plate member 104. When this happens, the area between the first airflow and the ceiling plate member 104 comes to have negative pressure. However, the circular hole 112 is disposed in the ceiling plate member 104. For this reason, air flows in from this circular hole 112 and the negative pressure is eliminated.

In this manner, the negative pressure generated by the first airflow is eliminated, so irregularity of the rotation of the polygon mirror 54 can be suppressed in comparison to when the optical scanning device does not have this configuration.

Here, the inventor of the present application evaluated magnitudes of irregularity of rotation between when the projecting portion is not disposed in the ceiling plate member and when the projecting portion is disposed in the ceiling plate member.

As the test part, the present inventor used a regular hexagonal polygon mirror where the outer diameter of the circumscribed circle was 40 mm and adjusted the polygon mirror such that the circumscribed circle of the polygon mirror coincided with the circle drawn by the step portion with a step of 1 mm when seen from the axial direction. Further, as a comparison, the present inventor also performed a test where the ceiling plate member was flat.

Magnitudes of irregularity of rotation are represented by the vertical axis of FIG. 6. Nine tests were performed, and as will be understood from FIG. 6, irregularity of rotation is suppressed by disposing the projecting portion.

Next, the inventor of the present application performed a test by making the diameter of the circle drawn by the step portion into the three parameters of 44 mm, 40 mm and 36 mm and changing the distance between the ceiling plate member and the polygon mirror.

As the test part, the present inventor used a regular hexagonal polygon mirror where the diameter of the circumscribed circle was 40 mm. The step of the step portion was 1 mm.

First, the present inventor performed a test in regard to when the side wall member is not disposed. FIG. 5 shows test results when the side wall member is not disposed. The horizontal axis represents the distance (dimension C shown in FIG. 1) between the ceiling plate member and the polygon mirror, and the vertical axis represents the magnitude of irregularity of rotation.

From these results, it will be understood that the magnitude of irregularity of rotation becomes smaller the smaller the distance is between the ceiling plate member and the polygon mirror. Moreover, it will also be understood that the magnitude of irregularity of rotation becomes even smaller when the diameter of the circle drawn by the step portion is the same as the size of the circumscribed circle of the polygon mirror. Further, this tendency appears pronounced when the distance becomes equal to or less than 1.3 mm.

Next, the present inventor performed a test in regard to when the side wall member, which covers the reflecting mirror surfaces a certain distance away from the polygon mirror, is disposed. FIG. 4 shows tests results when the side wall member is disposed. The horizontal axis represents the distance (dimension C shown in FIG. 1) between the ceiling plate member and the polygon mirror, and the vertical axis represents the magnitude of irregularity of rotation.

From these results, it will be understood that the magnitude of irregularity of rotation becomes smaller the smaller the distance is between the ceiling plate member and the polygon mirror. Moreover, it will also be understood that the magnitude of irregularity of rotation becomes even smaller when the diameter of the circle drawn by the step portion is the same as the size of the circumscribed circle of the polygon mirror. Further, it will be understood that this tendency appears pronounced when the distance becomes equal to or less than 1.3 mm.

As will also be understood from these results, it will be understood that irregularity of rotation is significantly suppressed when the circle drawn by the step portion substantially coincides with the circumscribed circle of the polygon mirror and when the distance between the ceiling plate member and the polygon mirror is made equal to or less than 1.3 mm.

Next, the inventor of the present application performed a noise evaluation between when the straight line portion 106B and the small circular arc portion 106C are disposed in the circular arc-shaped circular arc portion 106A (see FIG. 3) that covers the reflecting mirror surfaces 54A a certain distance away from the polygon mirror 54 and when the straight line portion 106B and the small circular arc portion 106C are not disposed.

The number of rotations of the polygon mirror is shown on the horizontal axis of FIG. 7A, and the magnitude of noise during rotation is shown in the vertical axis. It will be noted that this noise is noise of the entire optical scanning device.

Figure 7B:
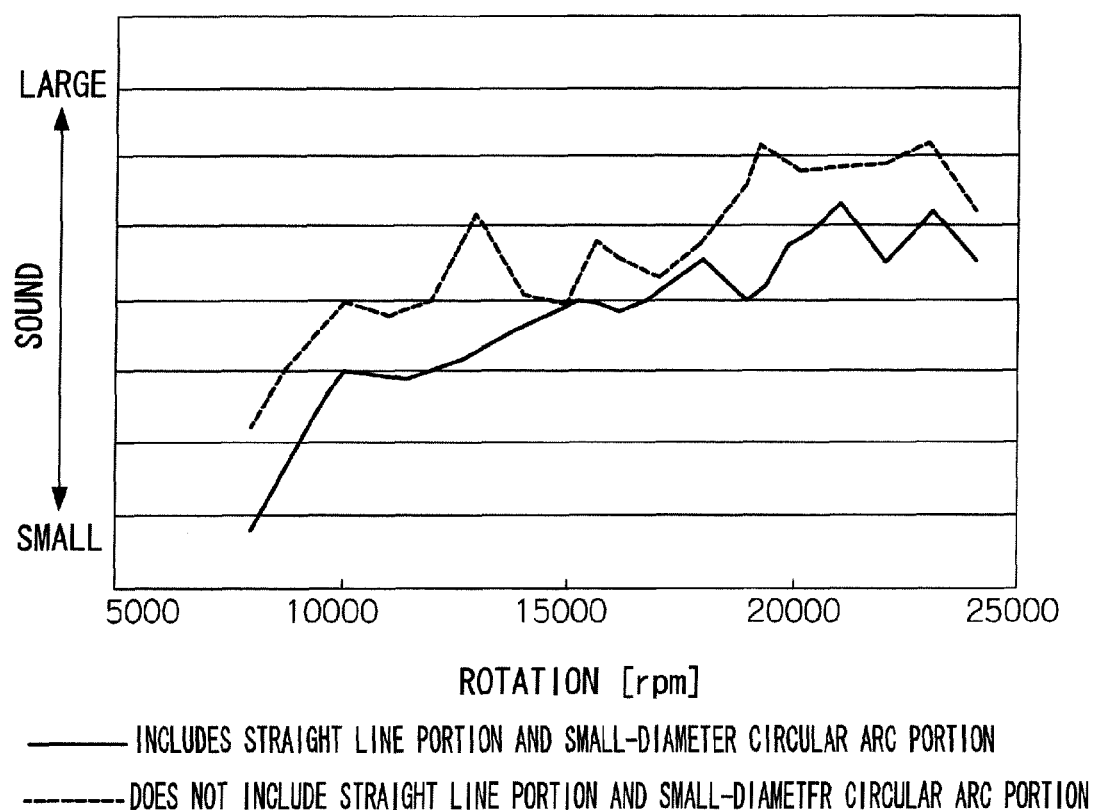

Further, the number of rotations of the polygon mirror is shown on the horizontal axis of FIG. 7B, and the magnitude of noise during rotation is shown in the vertical axis. It will be noted that this noise is noise where the component of wind sound of the polygon mirror has been extracted from the noise of the entire optical scanning device.

The dotted line represents when the straight line portion 106B and the small circular arc portion 106C are not disposed. The solid line represents when the straight line portion 106B and the small circular arc portion 106C are disposed. As will also be understood from these results, it will be understood that, no matter what the number of rotations, the magnitude of noise is small when the straight line portion 106B and the small circular arc portion 106C are disposed.

It will be noted that, although the present invention has been described in detail in regard to a specific exemplary embodiment, the present invention is not limited to this exemplary embodiment. It will be apparent to persons skilled in the art that various other embodiments are possible within the scope of the present invention. For example, in the preceding exemplary embodiment, the step portion was disposed so as to draw a circle when seen from the axial direction, but the step portion is not particularly limited to a circle; the step portion may also be configured such that at least part of the step portion draws a circle (circular arc) or such that the step portion does not draw a circle.

Further, in the preceding exemplary embodiment, the present invention has been described by a configuration where two optical scanning devices were arranged in the horizontal direction inside the image forming apparatus and where the optical scanning devices optically scanned two photoconductors each. However, the present invention is not limited to this. The present invention may also have a configuration where an optical scanning device is disposed for each photoconductor and where each optical scanning device optically scans one photoconductor or a configuration where one optical scanning device optically scans three or more photoconductors.

Moreover, in the preceding exemplary embodiment, the present invention has been described by a configuration where the axial direction of the rotating shaft of the polygon mirror substantially coincided with the direction of gravity. However, the present invention is not limited to this. The present invention may also have a configuration where the axial direction of the rotating shaft of the polygon mirror is disposed so as to intersect the direction of gravity, such as a configuration where the optical scanning device is disposed diagonally inside the image forming apparatus or a configuration where the optical scanning device is disposed vertically (in a state where the optical scanning device has been rotated + or −90 degrees with respect to the disposition of the optical scanning device in the preceding exemplary embodiment). Even with these dispositions, as long as the projecting portion is disposed in a direction away from the axial direction of the rotating shaft, irregularity of rotation of the polygon mirror can be suppressed.

What is claimed is:

1. An optical scanning device comprising:
   a rotating polygon mirror that rotates and deflects light that has been emitted from a light source;
   a plate member that is disposed above the rotating polygon minor and having a first plane adjacent to the rotating polygon mirror that intersects orthogonally with a rotational axis of the rotating polygon mirror and a second plane that is distanced away from the rotating polygon minor relative to the first plane at an outer periphery of the first plane.

2. The optical scanning device of claim 1, wherein the distance between the first plane of the plate member and an upper surface of the rotating polygon mirror parallel to the plate member is approximately 1.3 mm or less.

3. The optical scanning device of claim 2, wherein a center of the first plane when seen from an axial direction of a rotating shaft of the rotating polygon minor is disposed substantially on the rotating shaft.

4. The optical scanning device of claim 3, wherein the difference between a radius of a circumscribed circle of the rotating polygon minor and a radius of the first plane is approximately 2 mm or less when seen from the axial direction of the rotating shaft of the polygon minor.

5. The optical scanning device of claim 1, wherein the plate member comprises a hole that penetrates the plate member and that is formed in the first plane, the hole connecting an inside and an outside of the optical scanning device.

6. The optical scanning device of claim 1, further comprising
   a side wall member that supports the plate member, and a lens member that transmits light deflected by the rotating polygon minor,
   wherein the side wall member and the lens member surround deflection surfaces of the rotating polygon minor, and a part of the surrounding of the rotating polygon mirror is open.

7. An image forming apparatus comprising:
   the optical scanning device of claim 1; and
   a photoconductor on whose surface an electrostatic latent image is formed as a result of being irradiated with the light that has been emitted by the optical scanning device.

8. The optical scanning device of claim 1, wherein the plate member is an upper cover of the optical scanning device.

9. The optical scanning device of claim 1, wherein the first plane is configured to substantially coincide with a circumscribed circle of the rotating polygon mirror when seen from an axial direction of a rotating shaft of the rotating polygon minor.

10. The optical scanning device of claim 1, wherein the first plane entirely covers an upper surface of the rotating polygon minor, and
    the plate member further comprises a longitudinal portion extending along an axis from the outer periphery of the first plane in a direction away from the rotating polygon minor to make a connection with the second plane.

11. The optical scanning device of claim 10, wherein the second plane extends in a horizontal direction to make a connection with an edge of a side wall member, and
    the first plane, the longitudinal portion, and the second plane form a step portion.

* * * * *